(12) United States Patent
Guo et al.

(10) Patent No.: US 10,400,101 B2
(45) Date of Patent: Sep. 3, 2019

(54) BIOCOMPATIBLE POLYCARBONATE AND RADIOPAQUE POLYMER COMPOSITIONS AND METHODS OF MANUFACTURING MEDICAL DEVICES WITH SAME

(71) Applicant: St. Jude Medical, Atrial Fibrillation Division, Inc., St. Paul, MN (US)

(72) Inventors: Xiaoping Guo, Eden Prairie, MN (US); David P. Johnson, Brooklyn Park, MN (US); Richard E. Stehr, Tuscon, AZ (US)

(73) Assignee: St. Jude Medical, Atrial Fibrillation Division, Inc., St. Paul, MN (US)

( * ) Notice: Subject to any disclaimer, the term of this patent is extended or adjusted under 35 U.S.C. 154(b) by 4 days.

(21) Appl. No.: 15/602,979

(22) Filed: May 23, 2017

(65) Prior Publication Data

US 2017/0321054 A1 Nov. 9, 2017

Related U.S. Application Data

(63) Continuation of application No. 12/347,217, filed on Dec. 31, 2008.

(51) Int. Cl.
| | | |
|---|---|---|
| *C08L 69/00* | (2006.01) | |
| *C08G 69/40* | (2006.01) | |
| *C08K 5/353* | (2006.01) | |
| *C08L 33/10* | (2006.01) | |
| *C08L 77/02* | (2006.01) | |
| *C08L 77/06* | (2006.01) | |
| *C08L 77/10* | (2006.01) | |

(52) U.S. Cl.
CPC .............. *C08L 69/00* (2013.01); *C08G 69/40* (2013.01); *C08K 5/353* (2013.01); *C08L 33/10* (2013.01); *C08L 77/02* (2013.01); *C08L 77/06* (2013.01); *C08L 77/10* (2013.01); *C08L 2666/20* (2013.01)

(58) Field of Classification Search
CPC .......... C08L 69/00; C08L 33/10; C08L 77/02; C08L 77/06; C08L 77/10; C08L 2666/20; C08G 69/40; C08K 5/353
USPC ......................................................... 523/113
See application file for complete search history.

(56) References Cited

U.S. PATENT DOCUMENTS

| | | | |
|---|---|---|---|
| 4,806,621 A | 2/1989 | Kohn et al. | |
| 4,838,904 A | 6/1989 | Sanders, Jr. et al. | |
| 4,880,856 A | 11/1989 | Avakian | |
| 4,937,130 A | 6/1990 | Clagett et al. | |
| 5,321,086 A | 6/1994 | Kozakura et al. | |
| 5,522,904 A | 6/1996 | Moran et al. | |
| 5,762,849 A | 6/1998 | Argast et al. | |
| 7,118,594 B2 | 10/2006 | Quiachon et al. | |
| 7,348,394 B2 | 3/2008 | Shyamroy et al. | |
| 2002/0177648 A1 | 11/2002 | Isozaki | |
| 2003/0004563 A1 | 1/2003 | Jackson et al. | |
| 2003/0152728 A1 | 8/2003 | Wang et al. | |
| 2004/0126596 A1 | 7/2004 | Zamora et al. | |
| 2005/0043808 A1 | 2/2005 | Felt et al. | |
| 2005/0113535 A1 | 5/2005 | Glasgow et al. | |
| 2005/0234193 A1* | 10/2005 | Sasagawa ................ C08F 8/04 525/88 |
| 2006/0047096 A1 | 3/2006 | Takahashi et al. | |
| 2006/0142489 A1 | 6/2006 | Chou et al. | |
| 2006/0151923 A1 | 7/2006 | Wilkowske et al. | |
| 2006/0199919 A1 | 9/2006 | Hale et al. | |
| 2006/0204698 A1 | 9/2006 | Miller et al. | |
| 2006/0251824 A1 | 11/2006 | Boulais et al. | |
| 2007/0015081 A1 | 1/2007 | van den Bogerd et al. | |
| 2007/0135751 A1 | 6/2007 | DiCarlo et al. | |
| 2007/0293626 A1 | 12/2007 | Chakravarti et al. | |
| 2007/0299168 A1 | 12/2007 | Ariki et al. | |
| 2007/0299424 A1 | 12/2007 | Cumming et al. | |
| 2008/0070023 A1 | 3/2008 | Topoulos | |
| 2008/0194991 A1 | 8/2008 | Teague et al. | |
| 2008/0234660 A2 | 9/2008 | Cumming et al. | |

FOREIGN PATENT DOCUMENTS

| | | |
|---|---|---|
| EP | 0423510 | 4/1991 |
| WO | 0200092 | 1/2002 |
| WO | 2007067538 | 6/2007 |

OTHER PUBLICATIONS

Extended European Search Report for EP Application No. 09015747 dated Mar. 15, 2012.

* cited by examiner

*Primary Examiner* — Angela C Scott
(74) *Attorney, Agent, or Firm* — Wiley Rein LLP

(57) ABSTRACT

The invention relates to biocompatible polycarbonate/polyamide polymer compositions for use in medical and surgical devices. Additional additives, crosslinking agents, phosphites, and optionally a radiopaque filler or fillers can be used to produce the high performance compositions desired. The polymer compositions have improved melt processability along with balanced or enhanced physical and mechanical properties, especially when combined or over-extruded onto or covering other polymer layers, such as soft and/or flexible layers commonly used in medical device applications and catheter tips, for example. The ability to incorporate radiopaque compounds into these polymer compositions during melt processing offers improved methods for monitoring and visualizing medical devices when used inside the body and as well as improving the operating characteristics of the medical device components.

15 Claims, No Drawings

BIOCOMPATIBLE POLYCARBONATE AND RADIOPAQUE POLYMER COMPOSITIONS AND METHODS OF MANUFACTURING MEDICAL DEVICES WITH SAME

CROSS-REFERENCE TO RELATED APPLICATIONS

This application is a continuation of U.S. application Ser. No. 12/347,217, filed 31 Dec. 2008, now pending. The foregoing application is hereby incorporated by reference in its entirety as though fully set forth herein.

BACKGROUND OF THE INVENTION a. Field of the Invention

The invention relates to radiopaque polymer compositions for use in medical and surgical devices. The polymer compositions have improved melt processability along with balanced or enhanced physical and mechanical properties, especially when combined with or over-extruded onto or covering other polymer layers, such as soft and/or flexible layers commonly used in medical device applications and catheter tips, for example. The ability to incorporate radiopaque components allows improved methods for monitoring and visualizing medical devices when used inside the body and improves the operating characteristics of the medical device components.

b. Background and Introduction to Invention

A growing number of surgical or medical procedures employ devices and kits that rely on inserting a device, catheter, or tube into the body and visualizing the placement or movement of the device and/or its progress during a procedure. There is an increasing need for developing radiopaque polymer compounds that can be used for high performance catheter shafts employed in these procedures. However, radiopaque compounds must be chemically compatible with the thermoplastic elastomer or other polymer selected for the flexible and soft medical devices or parts thereof, such as catheter tips. For example, the catheter tip materials can be composed of soft, polyamide-based thermoplastic elastomers, polyester-based thermoplastic elastomers, thermoplastic polyurethanes, or silicone-thermoplastic polyurethanes having low durometers ranging from 25 D to 55 D. These soft polymer materials may not have significant radiopaque properties and more undesirably, they are largely lacking in the sufficient mechanical strength properties required for making the slender body of a catheter shaft, for example.

Polycarbonate (PC) resins are widely used and commercially available. PC resins are selected primarily due to their superb material toughness, thermal stability, and excellent mechanical strength. However, polycarbonate has limited chemical resistance and is characterized by a rapid solidification during melt processing due to its amorphous nature. The latter property may make it difficult to over-extrude PC on other layers by melt processing. Also, high performance polycarbonate resins generally have high viscosity due to high molecular weights, and generally have to be extrusion-processed at temperatures as high as 270° C., even up to 300° C. This imposes limitations on the types of processes and products that can be manufactured from PC in combination with other polymer materials having lower melt processing temperatures. Therefore, a number of limitations exist in using pure PC resins for medical and surgical devices.

Accordingly, in one aspect, the invention addresses the need for radiopaque polymers that can be used in medical and surgical devices. In another aspect, the invention addresses the need for polycarbonate resins that can be modified for use as a high-performance polymer in medical and surgical devices and methods. As explained more fully below, the polymer compositions of the invention improve the melt processability of polycarbonate resin along with various enhancements in physical and mechanical performance when used for a variety of medical and surgical devices and kits. In addition, the polymer compositions of the invention can be used to improve the X-ray radiopacity, namely the ability to visualize basic catheter and medical device parts or elements in the human body.

BRIEF SUMMARY OF THE INVENTION

In one aspect, the invention addresses the use of a radiopaque polymer composition to make at least a part of or an element to a medical or surgical device, or a kit comprising such medical or surgical devices. Incorporating the radiopaque polymer compositions with new or existing designs and polymer layers allows the devices to be more easily visualized during medical and surgical procedures. In another aspect, a high performance polymer composition where one of the base polymer resins is poly(bisphenol A carbonate) or simply a polycarbonate (PC) and another component is a polyamide resin. Various additives, stabilizers, crosslinking agents, block copolymers, and other biocompatible components can be mixed with the base polymer resins. An inorganic radiopaque filler is then optionally added to this mixture and the combined product melt-mixed to form a polymer or radiopaque polymer composition.

In more particular aspects of the invention, the biocompatible, radiopaque polymer composition comprises poly(bisphenol A carbonate), a polyamide, and an inorganic radiopaque filler. In this or any aspect of the invention, the polyamide component can be one or more aromatic polyamides and aliphatic polyamides, such as nylon-6,6, nylon-6, nylon-11, nylon-12, and nylon 6T. The optional inorganic radiopaque filler can be one or more of barium sulfate ($BaSO_4$), bismuth subcarbonate, bismuth oxychloride, bismuth trioxide, tantalum, and tungsten, and micropowders of these.

In particular embodiments, the polymer composition also includes an organic or aryl phosphite. Phosphites are known as additives or stabilizers to polymer compositions, and many are known to be used in biocompatible polymer compositions. Thus, one or more organic phosphites having the general structure below can be added to the radiopaque polymer compositions of the invention.

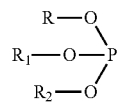

wherein R, R1, and R2 are selected from: a phenyl group; substituted phenyl groups;
phenyl groups substituted by an alkyl group of 1 to 20 carbon atoms in length.

A preferred phosphite is tris(2,4-di-tert-butylphenyl)phosphite (commercially available as, for example, Albermarle Ethaphos 368, or Cibalrganox B900).

In addition or in the alternative to the above additives, the polymer compositions of the invention can include one or more functionalized polyolefins, thermoplastic olefins, and thermoplastic olefins having an anhydride reactive group. For example, the polyolefin or olefin can be selected from one or more of: methacrylate-butadiene-styrene copolymer (MBS); maleic anhydride-grafted polyethylene and polypropylene; maleated SBS (styrene-butadien-styrene copolymer); maleated SIBS (styrene-isobutylene-styrene); and maleated SIS (styrene-isoprene-styrene copolymer). Also in addition or in the alternative to the above additives, the polymer compositions of the invention can include a functionalized polymer containing an epoxide group. The functionalized polymer containing an epoxide group can be one or more of: ethylene-butyl acrylate-acrylic acid terpolymer with epoxide group; and glycidal methacrylate (GMA).

Also in addition or in the alternative to the above additives, the polymer compositions of the invention can include one or more oxazoline or bis-oxazoline compounds having the following general formula:

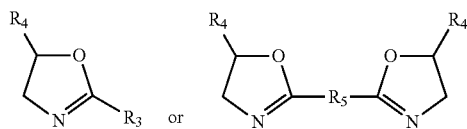

wherein $R_5$ is an alkylene group having 1 to 20 carbon atoms, or an arylene group having 6 to 12 carbon atoms, or an alkylene-arylene group having from 7 to 20 carbon atoms;

$R_3$ is selected from hydrogen, or alkyl group having 1 to 20 carbons, or aryl group having 6 to 12 carbon atoms, or alkyl-aryl group having 7 to 20 carbon atoms; and $R_4$ is selected from hydrogen, alkyl group having 1 to 20 carbons, or aryl group having 6 to 12 carbon atoms, or alkyl-aryl group having 7 to 20 carbon atoms.

A preferred example of the oxazoline compound is 1,3-phenylene-bisoxazoline or 2,4-phenylene-bisoxazoline.

Specific ranges of each of the components noted above or throughout this disclosure can be selected for optimum physical and mechanical characteristics. For example, a polymer composition wherein the PC component, such as poly(bisphenol A carbonate), is present from about 30 to about 90 wt. % can be used in any combination, and the polyamide component, such as nylon-11 or nylon-12, can be present from about 10 to about 70 wt. %. The radiopaque filler can be loaded at or present at about 5 to 60 wt. %, or preferably about 10 to 40 wt. %. The oxazoline or bis-oxazoline compound, such as 1,3-phenylbisoxazoline, can be present at a concentration of about 0.2 to about 5 phr (parts per hundred resin), or about 0.5 to about 1.0 phr.

The functionalized polyolefins, thermoplastic olefins, and thermoplastic olefins having an anhydride reactive group can be present at about 2 to about 20 wt. %, or about 5 to about 10 wt. %.

The functionalized polymer containing an epoxide group can be present at a concentration of about 2 to 20 wt %, or about 5 to 10 wt %.

The invention also includes methods of producing a biocompatible polymer composition. These methods can be used to produce raw material that can be later used in melt-coating or melt-extrusion of a medical device or catheter. In general, the methods comprise using a polycarbonate, such as poly(bisphenol A carbonate), a polyamide, and optionally an inorganic radiopaque filler. The polycarbonate and polyamide are mixed and then processed by melt compounding apparatus, such as batch melt mixer, or continuous single-screw or twin-screw extruder and the inorganic radiopaque filler is optionally added during melt mixing. Generally, melting temperatures from about 220 to about 300° C. are used, or preferably at about 220 to about 250° C. As above, a phosphite can be added to the polymer mixture.

The additive, stabilizer, crosslinking components mentioned above can all, individually, or any combination, be added in these melt mixing or compounding methods. In another aspect, the high performance or radiopaque polymer compositions can be melted onto an existing layer of a medical device, component of a medical device, or catheter, for example, so that the device or component or catheter is coated with a layer of the polymer composition. In a preferred example, the device or component is part of an inserted medical device that has an increased opacity to a visualization method by virtue of the incorporated radiopaque polymer composition. Furthermore, multilayered structures can also be produced and used according to the invention, wherein at least one layer comprises a radiopaque polymer composition. Generally, the radiopaque layer is the outermost layer of the medical device, but it is not required to be the outermost layer. In addition, various lengths of the device can comprise the radiopaque polymer composition of the invention, anywhere from the entire insertion length, to less than 10% of the insertion length, to only the distal tip or inserting end of the insertion device, and even intermittent or non-contiguous sections covering a desired percentage of the insertion length can be used. Thus, a multilayered device can be made and used, and one of skill in the art is familiar with molding and co-extrusion processes, for example, for producing these parts of medical devices.

Accordingly, it is one object of the invention to provide a medical or surgical device that comprises a radiopaque polymer composition in part of its length. The parts or elements of the medical or surgical devices that contain the radiopaque polymer composition thus exhibit improved mechanical properties with respect to at least the ability to visualize them, for example under an X-ray fluoroscope. Other objects, features, details, utilities, and advantages of the present invention will be apparent from the following, more particular, written description of various embodiments and examples of the invention, as further illustrated in the accompanying examples and defined in the appended claims.

DETAILED DESCRIPTION OF THE INVENTION

Throughout this disclosure, applicants refer to texts, patent documents, and other sources of information. One skilled in the art can use the entire contents of any of the cited sources of information to make and use aspects of this invention. Each and every cited source of information is specifically incorporated herein by reference in its entirety. Portions of these sources may be included in this document as allowed or required. However, the meaning of any term or phrase specifically defined or explained in this disclosure shall not be modified by the content of any of the sources.

The headings (such as "Introduction" and "Brief Summary") used are intended only for general organization of topics within the disclosure of the invention and are not intended to limit the disclosure of the invention or any aspect of it. In particular, subject matter disclosed in the "Background" includes aspects of technology within the scope of the invention and thus may not constitute background art. Subject matter disclosed in the "Brief Summary" is not an exhaustive or complete disclosure of the entire scope of the invention or any particular embodiment.

As used herein, the words "preferred," "preferentially," and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention and no disclaimer of other embodiments should be inferred from the discussion of a preferred embodiment or a figure showing a preferred embodiment. In fact, the nature of the polymer compositions of the invention allows one of skill in the art to make and use the invention on any medical or surgical device available or contemplated.

The phrases "radiopaque polymer composition" and "polymer composition of the invention" all refer to a composition comprising an inorganic radiopaque filler in a biocompatible polymer or blend of polymers that is biocompatible. In preferred embodiments, the composition is composed of polymer compounds and fillers or additives that have not previously been used together, or previously used in a particular ratio or ratios, for use in a medical, surgical, or biomedical device.

The invention relates to the new, successful development of various radiopaque compositions, and especially poly (bisphenol A carbonate) compositions, which can be used to make or melt-coat a variety of medical and surgical devices. In one aspect, particular surfaces or elements of devices comprise a radiopaque polymer composition of the invention. The medical or surgical devices of preferred interest include, but are not limited to, braided or non-braided catheter shafts.

In one general sense and without any intention to limit the scope to any particular explanation or mechanism for how it works, the invention provides a high-performance polymer composition. As a base component, a polycarbonate (PC) polymer is used. PC resins are widely used and commercially available under tradenames Lexan® or Makrolon®. PC resins are selected primarily due to their superb material toughness, thermal stability, and excellent mechanical strength as compared to other polymer materials currently used for medical devices, such as in the catheter shafts. Also, PC resins posses an inherent, chemical compatibility or melt-bondability with the types of polar thermoplastic elastomer materials that are commonly used for the soft, flexible catheter tips or other insertion regions of medical devices. These commonly used thermoplastic elastomers include poly(ether-block-amide), poly(ether-block-ester), or thermoplastic polyurethanes. There are, however, limitations in PC resins, such as chemical resistance and rapid solidification during melt process due to its amorphous nature. Also, thermal fusion bonding to soft, flexible catheter tips is conducted at high temperatures where softer thermoplastic elastomers may be thermally degraded.

The invention, therefore, improves upon known PC-based compositions that may have been used in medical devices in order to improve its chemical resistance, melt processability, and melt compoundability while maintaining or even enhancing its well-known mechanical strength and fracture toughness. In addition, the use of a radiopaque component makes the polymer compositions of the invention especially useful in medical and surgical procedures.

There are several technical avenues for modifying a PC resin and compounding it with the incorporation of radiopaque fillers, such as barium sulfate. To reduce melt viscosity and improve melt processability and compoundability of high molecular weight PC, a small amount of viscosity modifiers, plasticizers, or lubricants can be added to the PC resin. Also, other polymers or copolymers with good flow properties, biocompatibility, and chemical compatibility can be introduced. To increase chemical resistance, semicrystalline polymer resins are generally blended into the PC resin, just like commercially marketed PC/PET blends and PC/PBT blends, where PET refers to poly(ethylene terephthalate) and PBT refers to poly(butylene terephthalate).

In one aspect of the methods of making the polymer compositions of the invention, an in-situ reactive compounding method is used to prepare various radiopaque PC compounds using at least three ingredients: a PC homopolymer, a polyamide homopolymer or copolymer, and an inorganic radiopaque filler or powder. Other ingredients for enhancing the reactive compounding and stabilizing the polymer phase or its morphology can be also introduced at one or more stages. With being bound to or limited by any particular method of reaction or reaction mechanisms, the present polymer compositions can be made during reactive compounding process, where a carbonate-amide exchange reaction (or transamidation) can occur between the PC and polyamide at temperatures as high as 245° C., as known in the art. This exchange reaction produces a small amount of high molecular weight alcohol species, which may act as highly effective lubricants for reducing melt viscosity of the PC resin and improving melt compoundability and processability. At the same time, the transreactions between carbonate ester groups of the PC resin and the amino or amide groups of polyamide resin generates high molecular weight poly(carbonate-co-amide), which serves as chemical compatibilizer and can reduce the interfacial tension between polyamide and polycarbonate. In certain examples, this facilitates the dispersion of both nylon melt and barium sulfate particles, and further enhances the adhesion between the phases in the solid state. The compatibilizing effects of the in-situ formed copolymer can improve the mechanical properties of the polymers produced.

Polyamide (or nylon) resin is semicrystalline in nature, thus enhancing the chemical resistance of the polymers and radiopaque polymers of the invention. In other examples, barium sulfate has a significant reinforcing effect due to its absorption by polyamides and polyamide-based thermoplastic elastomers. Thus, the incorporation of barium sulfate particles, or other inorganic radiopaque compounds or micropowders, at submicron sizes, could further improve the mechanical properties of the final polymer compositions.

Other ingredients can be added into the compounds containing PC, polyamide and barium sulfate in order to control the carbonate-amide exchange reactions or to introduce additional compatibilizing effects, if needed or desired. Such ingredients can be phosphites, functionalized polyolefins with anhydride and epoxide reactive groups, or oxazolines due to their high reactivity with either carbonate or amide groups, or combinations of these additives.

Table 1 outlines several formulations and the relevant mechanical properties measured from tensile mechanical tests at the same cross-head speed, 20 in/min (or the same strain rate), on an Instron tester. The compounds are prepared with the noted components and mixed/melted using a lab-scale twin screw extruder equipped with single-screw pellet feeder and twin-screw powder feeder. The melt-compounding temperatures range from 220 to 250° C. After compounding, standard ASTM mechanical test specimens are prepared using a micromolding machine.

Several compositions can be used to manufacture a catheter shaft, for example. The evaluations in the "Notes" of Table 1 indicate that the compositions listed as "potential" or "high potential" have characteristics useful for a catheter shaft and meet stringent clinical needs that surpass existing products made of some radiopaque polymer materials that do not contain a polycarbonate component. Other compositions listed in Table 1 can be useful for other purposes.

Due to mechanical performance requirements, the sheaths or shafts of cardiac catheters are generally comprised of at least two different shaft segments with varying mechanical strength and flexibility. In one example, these two segments are a proximal segment or braided shaft segment and a distal segment or a flexible tip segment. These segments must be integrated or connected via bonding technology. A polymer material used for the braided shaft segment must meet the following criteria: 1) high mechanical strength or performance with synergic balance of rigidity, toughness, and kink resistance; (2) good thermal bondability with the flexible tip material such as the resins and compounds of poly(ether-block-amide) copolymer, or poly(ester-ether) copolymer, or thermoplastic polyurethane that have durameters of about 20 D to 60 D Shore, preferably 25 to 50 D Shore.

The braided shaft segment is typically a composite tubular structure, which generally has an inner and outer polymer layers made of a relatively rigid polymeric material, and optionally with a braided layer in between. The forces or torques imposed on the catheter control devices by an operator or surgeon can be more effectively transmitted to the catheter tip via the more rigid, braided shaft, and the catheter can be more easily delivered to the targeted sites in the body. On the contrary, the distal segment, for example a catheter tip, is generally made of a soft, flexible polymer material to ensure atraumatic access to the vessels and other tissues of the body. The braided shaft segment and flexible tip segment are integrated via thermal fusion or adhesive bonding processes.

In prior methods, the whole shaft of a catheter, including the braided shaft and flexible tip segments, is made of various radiopaque compounds of a homologous, thermoplastic elastomer with varying mechanical properties. This drastically limits the selection of a high performance polymeric material for making the catheter shafts. The homologous compounds of polyamide-based thermoplastic elastomer materials, for example Pebax®, commonly used for making catheter shafts, in which higher durometers grades, such as Pebax 7233 and 7033, are used for the braided shaft segments. Low durometer grade polymers, such as Pebax 4033 and 3533, are used for the flexible tips. Since Pebax materials are chemically derived from nylon-12 or nylon-6, but with a slightly higher mechanical strength or rigidity, they are commonly used to make the braided catheter shaft segments. Similarly, the homologous compounds of a polyester-based thermoplastic elastomer material, for example Hytrel®, can be used for the catheter shafts. However, these shaft materials could not meet some clinical needs for torque transmission, column strength, or pushability. Therefore, there is a need for high performance polymer compounds that can enhance the mechanical performance of the braided shaft segment, but are still chemically compatible or bondable to a typical thermoplastic elastomer used for the soft catheter tip segment.

Several compositions can be tested by tube extrusion using, for example, polymer resins including PC, Pebax, nylon-11, and nylon-12. As expected, the PC tube has the highest mechanical performance. However, over-coating of PC melt is difficult during the over-extrusion due to quick melt solidification properties immediately after exiting the die. Also, the compounding of PC with radiopaque fillers, such as barium sulfate, at typical loading concentrations (20 to 30 wt. %) can be difficult due to a high melt viscosity.

In order to take advantage of the mechanical performance of PC resins, we have developed PC-based radiopaque compositions with improved melt processability through the use of chemical compatibilization methods, as shown in the numerous examples below.

Illustrative Examples

Together with a mixture comprised of a polycarbonate and a polyamide, the components of the polymer composition can be varied to optimize hardness, weight, and thickness, flexibility, and melt properties, as one skilled in the art is familiar with. In addition, a stabilizer, such as a phosphite stabilizer, aryl phosphite, or organic phosphite, can be added. A preferred phosphite is tris(2,4-di-tert-butylphenyl) phosphite (commercially available as, for example, Albermarle Ethaphos 368, or Cibalrganox B900). The potential range of the phosphite in the polymer compositions is about 0.5 to about 5 phr (part per hundredth resin), preferably 1 to 2 phr.

In the Table 1 below, the PC is poly(bisphenol A carbonate) or polycarbonate resin, such as those commercially available as Makrolon 3108 (Bayer MaterialSciences), and the polyamide can be polyamide 12 (PA12), or nylon 12 resin, commercially available as Grilamid L25 (EMS-Chemie AG). Where used, a methacrylate-butadiene-styrene copolymer (MBS) can be added, typically core-shell impact modifier, commercially available as Clearstrength 950 (Arkema Inc.).

The optional radiopaque filler can be one or more of those referred to above, such as an inorganic barium sulfate radiopaque filler ($BaSO_4$). Other inorganic radiopaque fillers, such as tungsten and bismuth subcarbonate, can be also used.

Additional additives, such as a crosslinking agent like PBO (1,3-phenylene-bis-oxazoline), commercially available from Degussa-evonik Industries, can also be added. A poly(ether-block amide) copolymer, such as Pebax, can also be added, like the commercially available (PEBA-Pebax 7233) resins from Arkema Inc.

Thus, as presented in the Table 1, "85:15 PC:PA12; 1.5 phr phosphite; 25% BaSO4" stands for the following composition: the resin system consists of a dry blend of 85 parts polycarbonate resin with 15 parts polyamide 12 resin, and 1.5 phr phosphite added. The resin system, along with the phosphite additive, is first dry-blended using a tumbling mixer or by manual mixing. The resin system of the dry blend of the resins is charged into a twin-screw extruder (i.e. Thermo Eurolab 16 twin-screw compounding system), and the radiopaque $BaSO_4$ filler at the loading concentration of 25 wt. % in the resultant radiopaque polymer compound is side-fed into the extruder. During melt extrusion, all ingredients of the composition are mixed at the molten states of the resin components, extruded, cooled, and then pelletized. The pellets are dried and molded into specimens of standard geometry for uniaxial tensile tests. Various mechanical properties [young's modulus (E (ksi)); yield strength (sigma y (psi)); strain at yield (epsilon y (%)); ultimate strength at fracture (sigma f (psi)); strain at fracture (epsilon f (%)), and tensile fracture energy (Jf) ($lbf*ft/in^2$)] of the polymer compositions and the reference standards (Ref:) can be measured and are listed in Table 1 below.

TABLE 1

Exemplary PC Blends and Polymer Compositions

| Composition Notes | E (ksi) | $\sigma_y$ (psi) | $\varepsilon_y$ (%) | $\sigma_f$ (psi) | $\varepsilon_f$ (%) | $J_f$ (lbf*ft/in$^2$) | Notes |
|---|---|---|---|---|---|---|---|
| Ref.: PC | 142.4 | 9439 | 14.9 | 9.7 | 190 | 114 | Makrolon 3108 |
| Ref.: PA12 | 91.2 | 6751 | 12.9 | 7.3 | 447 | 195 | Grilamid L25 |
| Ref.: Pebax 7233 or Pebax | 42.5 | 3894 | 28.8 | 6.2 | 659 | 211 | |
| Ref: Pebax Filled with 30 wt. % BaSO$_4$ | 90.3 | 5576 | 19.4 | 5.0 | 438 | 139 | P/N 13268-022 |
| 20:80 PC:Pebax; 0.5 phr PBO | 75.2 | 5437.6 | 21.8 | 5.2 | 197 | 80 | potential |
| 20:80 PC:Pebax; 1.0 phr PBO | 76.3 | 5529.2 | 21.1 | 5.2 | 132 | 60 | potential |
| 20:80 PC:Pebax; 2.0 phr PBO | 76.2 | 5607.0 | 19.7 | 5.7 | 369 | 138 | potential |
| PC; 15 phr MBS. | 131.9 | 8448 | 14.0 | 8.3 | 151 | 81 | — |
| 50:50 PC:PA12; 1 phr phosphite. | 125.7 | 8172 | 13.1 | 6.9 | 236 | 113 | potential |
| 50:50 PC:PA12; 15 phr MBS. | 109.5 | 7007 | 12.9 | 7.1 | 208 | 95 | No effect by MBS |
| 80:20 PC:PA12; 1 phr phosphite. | 131.7 | 9232 | 15.0 | 9.2 | 153 | 89 | potential |
| 90:10 PC:PA12; 1 phr phosphite. | 137.7 | 9519 | 14.7 | 9.5 | 173 | 102 | potential |
| 85:15 PC:PA12; 1.5 phr phosphite; 25% BaSO$_4$ | 164.0 | 9537 | 12.5 | 9.2 | 129 | 73 | High potential |
| 91:9 PC:PA12; 25% BaSO$_4$ | 169.6 | 9067 | 12.1 | 9.0 | 150 | 85 | potential |
| 85:15 PC:PA12; 25+% BaSO$_4$ | 166.4 | 8939 | 11.5 | 9.0 | 126 | 71 | potential |
| 85:15 PC:PEBA7233; 25+% BaSO$_4$ | 173.3 | 8549 | 11.2 | 8.5 | 122 | 64 | — |
| 85:15 PC:PA12; 0.5 phr PBO; 25+% BaSO$_4$ | 175.5 | 9177 | 11.3 | 9.0 | 100 | 53 | potential |
| 85:15 PC:PEBA7233; 0.5 phr PBO; 25+% BaSO$_4$ | 165.3 | 9026 | 12.3 | 8.5 | 100 | 47 | — |
| 85:15 PC:PA12; 1.0 phr PBO; 25% BaSO$_4$ | 166.0 | 9378 | 11.9 | 9.2 | 100 | 50 | potential |
| 85:15 PC:PEBA7233; 1.0 phr PBO; 25% BaSO$_4$ | 156.9 | 9209 | 12.9 | 9.1 | 100 | 53 | potential |
| 50:50 PC:PA12; 25 wt % BaSO$_4$ (23.6%) | 154.8 | 8527 | 11.0 | 8.5 | 150 | 78 | potential |
| 60:40 PC:PA12; 25 wt % BaSO$_4$ (21.7%) | 153.1 | 8682 | 11.2 | 8.5 | 111 | 60 | potential |
| 70:30 PC:PA12; 25 wt % BaSO$_4$ (22.1%) | 150.7 | 8849 | 12.2 | 8.6 | 124 | 70 | potential |
| 80:20 PC:PA12; 25 wt % BaSO$_4$ (22.9%) | 147.8 | 9032 | 13.1 | 9.0 | 160 | 91 | High potential |
| 90:10 PC:PA12; 25 wt % BaSO$_4$ (29.0%) | 143.1 | 9279 | 13.3 | 9.3 | 146 | 84 | High potential |
| 50:50 PC:PA12; 1.0 phr phosphite; 25% BaSO$_4$ (21.3) | 146.0 | 9177 | 12.5 | 9.0 | 80 | 32 | — |
| 70:30 PC:PA12; 1.0 phr phosphite; 25% BaSO$_4$ (22.0) | 140.5 | 9351 | 12.8 | 9.0 | 50 | 28 | |

In the Table 1 "Composition Notes," the initial ratio represents the amount of PC to polyamide (PA) present on wt/wt %; a preferred PC is Makrolon 3108 (Bayer MaterialScience AG); a preferred polyamide is nylon-12 (PA12)

Grilamid L25 and an alternative is PEBA7233 and other Pebax polyether block amide; PBO is a crosslinking additive, such as 1,3-phenylene-bis-oxazoline, listed as present in phr units; Phosphite is listed as phr also, and can be commercially available products such as Albermarle Ethaphos 368; MBS is methacrylate-butadiene-styrene copolymer, such as Clearstrength 950; and loaded $BaSO_4$ is listed as wt %, with the final content as % listed in parenthesis.

In producing a medical device with any of the polymer or radiopaque polymer compositions of the invention, melt-processing of the polymer or radiopaque layer can be used as conventionally known. For example, a catheter segment or segments can be produced using a mandrel, such as one designed to form a proximal end and a distal end, as known in the art. A first or inner polymeric layer can be placed on the mandrel. The inner polymeric layer may be knotted at one end (e.g. the distal end) and then fed onto mandrel. In general, the inner polymeric layer can include a lumen having an inner surface and an outer surface. Additionally, designs with more than a single lumen can be used. The inner polymeric layer is generally an extruded polymer. In one embodiment, the inner polymeric layer is an extruded thermoplastic elastomer. In other embodiments, the inner polymer layer can be a polytetrafluoroethylene (PTFE), such as Teflon® brand, which is available commercially. The inner polymeric layer may optionally be chemically etched to provide better adhesion during melt processing. In addition or alternatively, the inner polymeric layer can have a scalloped or ribbed profile to make it more amenable for use in steerable devices. As a person of skill in the art will appreciate, the inner polymeric layer may be made of other melt processable polymers, such as any biocompatible and melt-processable polymer composition. Various methods of using a mandrel for the manufacture of devices containing one or more lumens are known in the art, and any, including those described in U.S. patent publication no. US 2006/0151923, which is incorporated herein by reference in its entirety, can be selected.

A radiopaque or outer polymeric layer can then be placed directly over the inner polymeric layer. In practice, it may be desirable to use more than one region of an outer polymer layer, for example where only the distal end is coated or covered with the radiopaque polymer compositions of the invention. Thus, the outer polymeric layer may be made of either single or multiple sections of tubing that may be either butted together or overlapped with each other, wherein at least one section is coated or covered with a polymer or radiopaque composition of the invention. Other outer polymer layers may be made of melt-processable polymers, such as poly(ether-block-amide), nylon, polyethylene and other thermoplastic elastomers. For example, the outer polymeric layer that is not radiopaque may be made of Pebax®, a polyether block amide of various durometers, such as Pebax 25D to Pebax 72D (Arkema Inc.). As noted, the outer polymeric layer of a device or catheter may also comprise more than one layer or segment, including for example two or more tubes of a melt processing polymer arranged to abut one another and/or to overlap one another. Additionally, various durometer materials can also be used in segments of the device. Thus, a first portion can be made of one selected Pebax and a second portion can be made of a second selected Pebax (for its mechanical properties). While the first and second portions can be different classes of the same material, the first and second portions can comprise different materials or compositions as well as be coated or overlaid with the polycarbonate and/or radiopaque polymer compositions of the invention. These first and second portions can be fused together by thermal heating or other means known in the art, as noted in U.S. patent publication no. 2008/0234660, specifically incorporated herein by reference in its entirety.

Optionally, a braided layer or metallic wire braided layer may be placed between the inner polymeric layer and the outer polymeric layer. This braided layer may be formed of stainless steel wire, including, for example, 0.003" high tensile stainless steel wire. The braided layer may also be formed of a metal alloy, for example, a copper alloy. The braided layer may be formed in a standard braid pattern and density, for example, about 16 wires at about 45 to about 60 picks per inch ("PPI") density. Alternatively, a braid may be used that is characterized by a varying braid density. For example, the braided layer may be characterized by a first braid density at the proximal end of the catheter and then transition to one or more different braid densities as the braided layer approaches the distal end of the device or catheter. The braid density at the distal end may be greater or less than the braid density at the proximal end. A catheter assembly having a braided layer with a varying braid density in described in U.S. patent publication no. 2007/0299424, which is incorporated herein by reference in its entirety. Alternatively, the braided layer may be applied directly about the inner polymer layer.

The polycarbonate or radiopaque polymer layer can be coated or melt-processed over the braided layer or the inner polymer layer using methods know in the art. The mandrel may be removed from the assembly, leaving behind a device with a lumen.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description shall be interpreted as illustrative only of particular embodiments and not limiting. All directional references (e.g., proximal, distal, upper, lower, upward, downward, left, right, lateral, front, back, top, bottom, above, below, vertical, horizontal, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Changes in detail or structure may be made without departing from the basic elements of the invention as defined in the following claims. The invention is not limited to any particular embodiment or example given here. Instead, one of skill in the art can use the information and concepts described to devise many other embodiments beyond those given specifically here.

What is claimed is:

1. A medical device, wherein the medical device comprises:
    a shaft, wherein the shaft comprises a first shaft segment and a second shaft segment, wherein the first shaft segment is proximal to the second shaft segment;
    wherein the first shaft segment comprises a biocompatible polymer composition, wherein the biocompatible polymer composition comprises:

poly(bisphenol A carbonate) homopolymer present from about 61.7 to 90 wt %,
a polyamide or a polyamide-based thermoplastic elastomer, and
an inorganic radiopaque filler.

2. The medical device of claim 1, wherein the polyamide is an aromatic polyamide.

3. The medical device of claim 1, wherein the polyamide is selected from: nylon-6,6; nylon-6; nylon-11; nylon-12; and nylon 6T.

4. The medical device of claim 1, wherein the polyamide-based thermoplastic elastomer is a poly(ether-block-amide) copolymer.

5. The medical device of claim 1, wherein the biocompatible polymer composition further comprises one or more organic phosphites having the general structure:

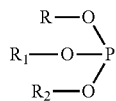

wherein R, R1, and R2 are selected from: phenyl; substituted phenyl groups; phenyl groups substituted by an alkyl group of 1 to 20 carbon atoms in length.

6. The medical device of claim 1, wherein the biocompatible polymer composition further comprises one or more functionalized polyolefins, thermoplastic olefins, and thermoplastic olefins having an anhydride reactive group.

7. The medical device of claim 6, wherein the polyolefin or olefin is selected from one or more of: maleic anhydride-grafted polyethylene and polypropylene; maleated SBS (styrene-butadiene-styrene copolymer); maleated SIBS (styrene-isobutylene-styrene); and maleated SIS (styrene-isoprene-styrene copolymer).

8. The medical device of claim 1, wherein the biocompatible polymer composition further comprises a functionalized polymer containing an epoxide group selected from the group consisting of ethylene-butyl acrylate-acrylic acid terpolymer with epoxide group; and glycidal methacrylate (GMA).

9. The medical device of claim 1, wherein the polyamide component is nylon-11, and further wherein the nylon-11 is present from about 2 to about 5 wt. %.

10. The medical device of claim 1, wherein the polyamide component is nylon-12, and further wherein the nylon-12 is present at about to 2 to about 5 wt. %.

11. The medical device of claim 1, wherein the inorganic radiopaque filler component is barium sulfate, and wherein the barium sulfate is loaded at about 10 to 40 wt. %.

12. The medical device of claim 1, wherein the biocompatible polymer composition further comprises 1,3-phenylenebisoxazoline, wherein the 1,3-phenylenebisoxazoline is present at a concentration of about 0.5 to about 1.0 phr (parts per hundred resin).

13. The medical device of claim 1, wherein the biocompatible polymer composition further comprises a maleated polyolefin, wherein the concentration of maleated polyolefin is about 2 to about 20 wt. %.

14. The medical device of claim 1, wherein the biocompatible polymer composition further comprises a glycidal methacrylate copolymer, wherein the glycidal methacrylate is present at a concentration of about 2 to 20 wt %.

15. The medical device of claim 1, wherein the medical device is a catheter, wherein the second shaft segment comprises a flexible tip.

* * * * *